United States Patent [19]

Warrior

[11] Patent Number: 5,122,794
[45] Date of Patent: * Jun. 16, 1992

[54] DUAL MASTER IMPLIED TOKEN COMMUNICATION SYSTEM

[75] Inventor: Jogesh Warrior, Shoreview, Minn.

[73] Assignee: Rosemount Inc., Eden Prairie, Minn.

[*] Notice: The portion of the term of this patent subsequent to Jan. 29, 2008 has been disclaimed.

[21] Appl. No.: 604,168

[22] Filed: Oct. 29, 1990

Related U.S. Application Data

[60] Division of Ser. No. 456,047, Dec. 26, 1989, Pat. No. 4,988,990, which is a continuation of Ser. No. 349,913, May 9, 1989, abandoned, which is a continuation of Ser. No. 84,398, Aug. 11, 1987, abandoned.

[51] Int. Cl.⁵ .......................... H04Q 9/00; H04L 7/00
[52] U.S. Cl. .......................... 340/825.20; 340/825.05; 370/85.3; 370/85.15
[58] Field of Search ............. 340/825.20, 825.05; 370/85.1, 85.2, 85.3, 85.15

[56] References Cited

U.S. PATENT DOCUMENTS

| | | | |
|---|---|---|---|
| 4,063,220 | 12/1977 | Metcalfe et al. | 340/825.5 |
| 4,139,737 | 2/1979 | Shimada et al. | 370/85.1 |
| 4,332,027 | 5/1982 | Malcolm et al. | 370/94 |
| 4,403,297 | 9/1983 | Tivy | 364/579 |
| 4,412,326 | 10/1983 | Limb | 370/85.3 |
| 4,498,168 | 2/1985 | Tseng | 370/85.3 |
| 4,520,488 | 5/1985 | Houvig et al. | 375/5 |
| 4,536,875 | 8/1985 | Kume et al. | 370/85.3 |
| 4,719,616 | 1/1988 | Akano | 370/11 |
| 4,755,991 | 7/1988 | Göertz | 370/85.2 |
| 4,771,423 | 10/1988 | Ohya et al. | 340/825.05 |
| 4,988,990 | 1/1991 | Warrior | 340/825.5 |

OTHER PUBLICATIONS

Motorola M6800 microprocessor course book, p. ACIA-3 (undated).
Telecommunications and the Computer, by James Martin, pp. 66, 67, 223, 238 through 241, and 581 through 583 (undated).

*Primary Examiner*—Donald J. Yusko
*Assistant Examiner*—Brian Zimmerman
*Attorney, Agent, or Firm*—Kinney & Lange

[57] ABSTRACT

A pair of master units share a common communication link to communicate with one or more slave units. Each slave unit transmits a message only in response to a message from one of the master units. When an initial transmission request is received by a master unit, it monitors the communication link and only initiates transmission of a message when the link has been quiet for a link quiet time period. After completing a transmission of a message, the master unit waits a link grant time period before transmitting again to permit the other master unit an opportunity to transmit a message if it desires. Synchronization of the two master units, therefore, is achieved quickly and with minimum overhead.

2 Claims, 4 Drawing Sheets

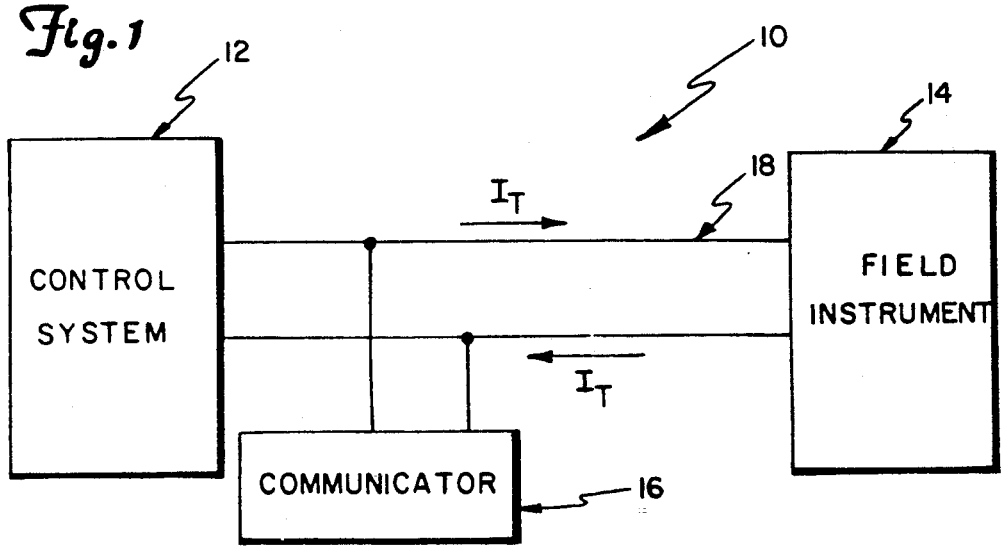
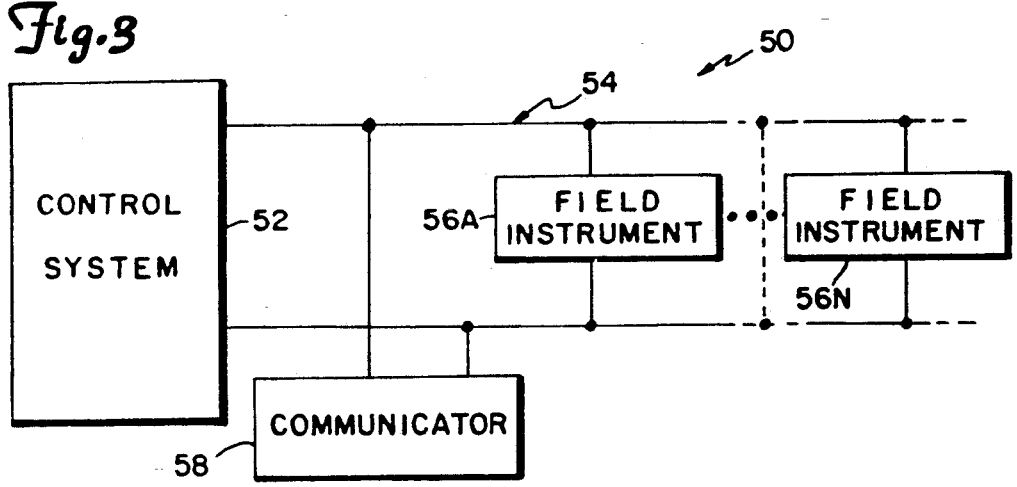
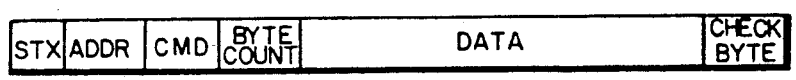
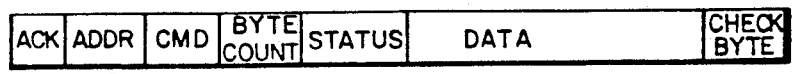

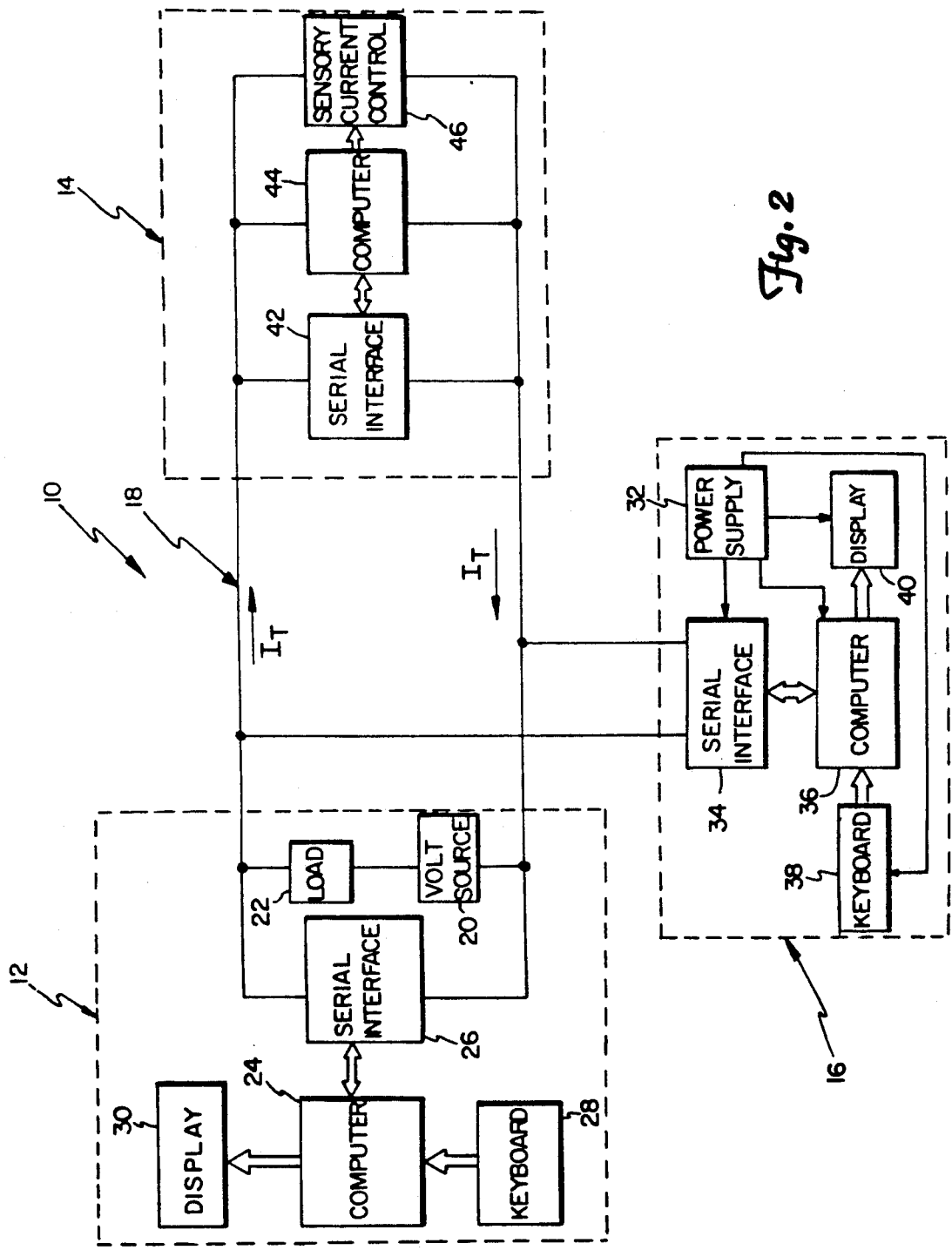

DUAL MASTER IMPLIED TOKEN COMMUNICATION SYSTEM

This is a division of application Ser. No. 07/456,047, now U.S. Pat. No. 4,988,990 filed on Dec. 26, 1989, which is a continuation of application Ser. No. 07/349,913 filed on May 9, 1989 (now abandoned), which is a continuation of application Ser. No. 07/084,398 filed Aug. 11, 1987 (now abandoned).

BACKGROUND OF THE INVENTION

1. Field of the Invention

The present invention relates to a communication system in which communication between multiple units is transmitted over a communication link common to the units. In particular, the present invention relates to a communication system in which a pair of master units take turns in transmitting messages to and receiving messages from one or more slave units.

2. Description of the Prior Art

Distributed data processing and process control systems generally use a communication path common to the system, such as a communication bus or link for transferring data among the various stations or units. There have been many different communication protocols which have been developed for determining the circumstances, order and priority among the units for communicating over the common communication link. It is desirable to provide reliable communication while minimizing delays in the transmission of data. Communication protocols typically set the rules by which the various units can access the communication link in order to reduce the possibility of two units transmitting at the same time over the link. Such a "collision" can result in a loss or corruption of the data being transmitted by each unit. Most communication protocols, however, achieve this increased reliability at the expense of increased overhead (i.e. additional time consumed communicating bits which control access to the bus, thus reducing time available for communicating data over the bus). As a result, the effective throughput of the system is reduced.

SUMMARY OF THE INVENTION

The present invention includes a communication system or method by which first and second master units couple to a common communication link for transmitting messages to and receiving messages from one or more slave units coupled to the link. Each of the two master units can initialize transmission of a message addressed to a slave unit on the link. With the present invention, a slave unit transmits a message only in response to a message addressed to it from one of the master units. Each master unit has a transmit-receive cycle comprising a "transmit time" period during which that master unit transmits a message to a selected slave unit, a "transmit time-out" period during which that master unit waits to receive a response from the selected slave unit, and a "link grant time" period during which that master unit can sense the start of the other master unit's transmit-receive cycle.

In response to a transmission request initiated by an operator or a control system coupled to a first master unit, the first master unit monitors the communication link during a "link quiet time" period before initiating transmission of a message, thereby reducing disruption of any ongoing transmit-receive cycle initiated by a second master unit. If the link is quiet, the first master unit initiates transmission after the link quiet time without having to synchronize its operation with the second master unit. If the link is busy, that is, in use by the second master unit, then the first master unit synchronizes its transmission to start within the link grant time of the second master unit.

If the first master unit starts transmitting a message within this link grant time, the second master unit senses this and waits to initiate another transmission until the first master unit is in the final link grant portion of its transmit-receive cycle or until the link quiet time period has expired. If the second master unit senses no transmission during its link grant time, then the second master unit can initiate a subsequent transmit-receive cycle, if desired, without having to wait the second master unit's link quiet time.

When only one master unit uses the link, substantially all of the time on the link is available for that master unit's transmit-receive cycles. When both master units use the link, the transmit-receive cycles of the two master units alternate, again using substantially all of the time available on the link, while providing shared access to the link for both master units. Synchronization of the two master units thus occurs without substantial delay or overhead on the bus.

In preferred embodiments of the present invention, the link quiet time or transmit-time out time defines a length of time which a master unit will wait after sending a message to a slave unit before determining that the addressed slave unit did not receive or respond to the message. If a master unit senses that the slave unit did not respond to the message, then the master unit can repeat the same message or send another message a selected number of times, thereby recovering from the failure of the addressed slave unit to respond properly.

Preferably, the "transmit time-out" time periods of the two master units have different magnitudes. This provides resolution of a collision if the two master units are out of synchronization and initiate transmission to the link simultaneously.

BRIEF DESCRIPTION OF THE DRAWINGS

FIG. 1 is a block diagram of a communication system using the dual master implied token communication of the present invention.

FIG. 2 is a detailed block diagram of an embodiment of the system of FIG. 1.

FIG. 3 is a block diagram of a further embodiment of a communication system using the present invention.

FIGS. 4A and 4B are diagrams showing master unit-to-slave unit and slave unit-to-master unit message data frame formats, respectively.

DETAILED DESCRIPTION OF THE PREFERRED EMBODIMENTS

Figure 5:
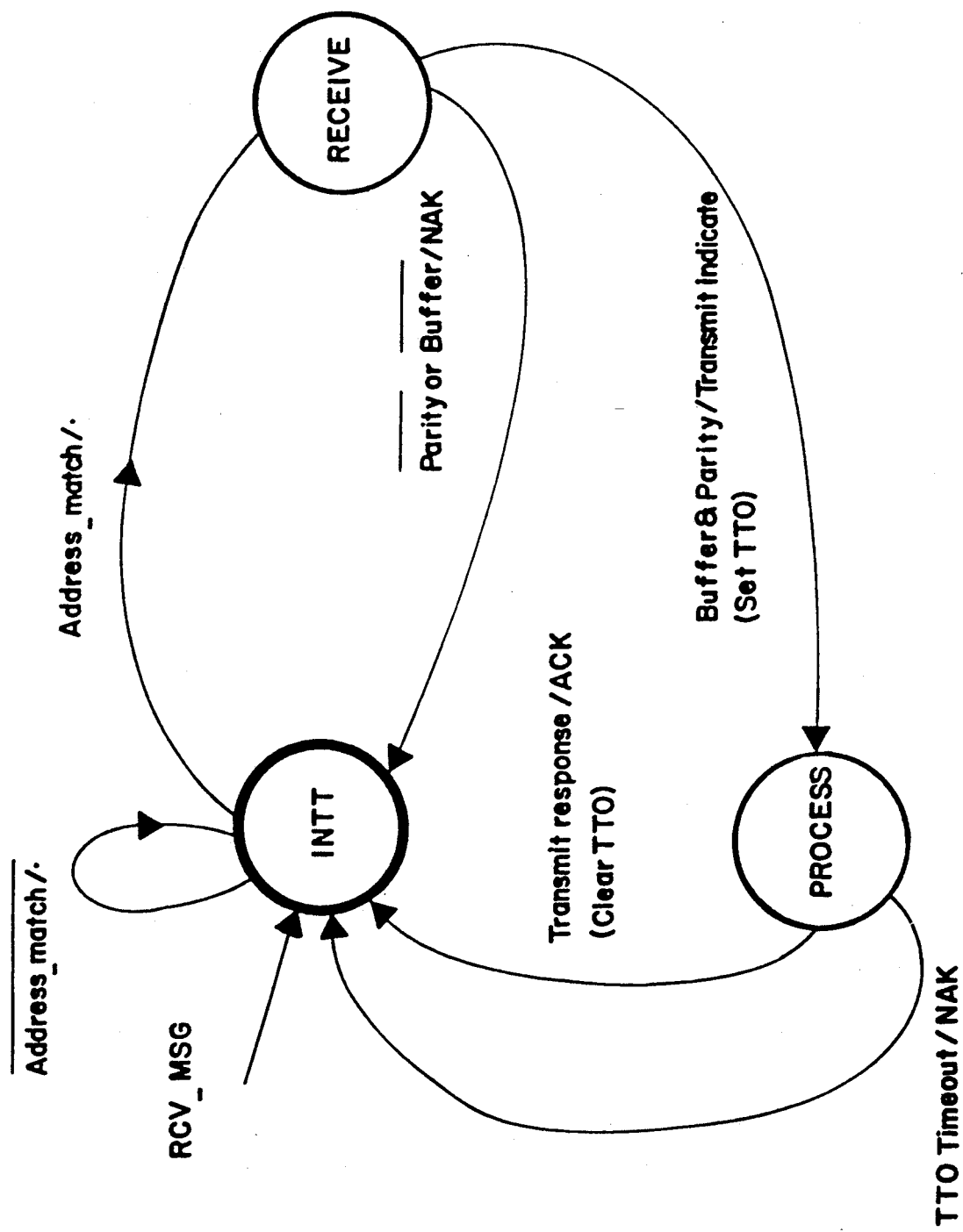
FIG. 5 is a finite state diagram of the communication arbitration protocol of the slave unit of the system of FIG. 2.

In the following detailed description, the present invention is described in the context of two-wire process control systems. The present invention, however, is applicable to a wide range of systems which use a communication bus or link which is common to various stations or units for transferring data among them.

In FIG. 1, a process control system 10 includes control system 12, field instrument 14, and communicator 16, all connected to a common communication link, two-wire current loop 18. Field instrument 14 is, in preferred embodiments, a two-wire process control transmitter controlling the magnitude of a loop current $I_T$ flowing through two-wire loop 18 as a function of a sensed parameter such as temperature, pressure, or flow.

Control system 12 energizes loop 18 and senses the magnitude of loop current $I_T$. Typically, control system 12 provides a display which shows the magnitude of the sensed parameter based upon the magnitude of loop current $I_T$. In addition, control system 12 may include circuitry for controlling other devices based upon the loop current $I_T$ controlled by field instrument 14.

Also connected to two-wire loop 18 is remote communicator 16. In preferred embodiments of the present invention, communicator 16 is a handheld device which can be temporarily connected by a service person to current loop 18 at locations remote from control system 12, field instrument 14, or both. Communicator 16 monitors field instrument 14 and is used for diagnosis and troubleshooting.

Loop current $I_T$ provides all of field instrument 14's energization and also carries information on the value of the sensed parameter back to control system 12. Loop Current $I_T$ is a very low frequency analog signal, such as a 4 to 20 milliampere DC current.

In addition to loop current $I_T$, communication is provided between control system 12 and field instrument 14 by a digital signal which is superimposed on or added to the loop current $I_T$. This digital signal, which is preferably in the form of a frequency shift key (FSK) modulated signal is at a higher frequency and lower amplitude than the loop current $I_T$. The communication signal is filtered from the analog circuits and does not affect the accuracy of the analog current $I_T$. The low frequency loop current $I_T$ is filtered from communications circuits so that it does not interfere with the higher frequency FSK signals.

Communicator 16 also communicates over the loop with field instrument 14 through a digital FSK signal. In the case of both control system 12 and communicator 16, two-way communication with field instrument 14 is provided. A serial digital signal is sent by control system 12 or communicator 16 to field instrument 14, and a serial digital reply is communicated back to the sender by field instrument 14.

In the system of the present invention, a master-slave relationship is maintained in which field instrument 14 is always a "slave unit". Field instrument 14 does not initiate digital communications over two-wire loop 18. Instead, it simply provides a response to a digital signal which is sent to it either by control system 12 or communicator 16. In other words, field instrument 14 responds with a message only when it is addressed by a master unit such as control system 12 or communicator 16.

The communication system of the present invention provides a reliable, "at least once" transaction-oriented communication path to and from field instrument 14 for digital data transfer. "At least once" means that the communication protocol of the present invention can deliver a given block of data more than once to field instrument 14 in the process of trying to achieve guaranteed delivery of that block of data. Errors due to noise on two-wire loop 18 are corrected by using an automatic repeat request (ARQ) protocol to re-send data blocks that may be corrupted by line noise or other disturbances.

In the present invention, access to communication with field instrument 14 is arbitrated. When both masters present conflicting demands for use of the time available on the bus, the demands are arbitrated by the communication system so that substantially equal priority is given to both communicator 16 and control system 12 in cases where both are being used simultaneously.

Digital information transfer over the communication link, two-wire loop 18, is through a defined message format. The entire message is preferably protected by a single parity check product code (i.e. vertical and longitudinal parity checking). Message framing is provided through a combination of an ASCII start frame delimiter and a message length field within each message. This provides a high degree of transparency of the protocol to user information. The protocol operation is substantially unaffected by the user information.

FIG. 2 shows an embodiment of the system 10 of FIG. Control system 12 includes a voltage source 20 and a load 22 connected across two-wire loop 18. Voltage source 20 energizes field instrument 14 through the two-wire loop 18. Load 22 represents the resistance of current sensing circuitry which measures loop current $I_T$ and provides an output indicating the magnitude of the parameter sensed by field instrument 14. Load 22, for example, can be an analog or digital meter.

Control system 12 also includes a computer 24, coupled to two-wire communication link 18 through serial interface 26. Computer 24 receives user input signals from keyboard 28, and displays information through display 30.

FSK modulated signals are generated by serial interface 26 and are transmitted along two-wire communication link 18. The FSK signals represent digital messages provided to serial interface 26 by computer 24.

Serial interface 26 also receives FSK signals from communication link 18 and provides messages in demodulated form to computer 24 when those messages are directed to control system 12.

Communicator 16 is preferably a handheld unit which is removably connected at the user's discretion to two-wire communication link 18. Communicator 16 has its own internal power supply 32, which provides power to serial interface 34, computer 36, keyboard 38 and display 40. The loop current $I_T$ does not flow through communicator 16. Serial interface 34 provides communication of FSK signals over communication link 18. Computer 36 provides messages to serial interface 34 to be sent to field instrument 14, and receives back response messages from field instrument 14 through serial interface 34. Keyboard 38 allows the user to provide input data and commands to computer 36. Display 40 provides an output to the user under the control of computer 36.

Field instrument 14 is powered solely by loop current $I_T$, and includes a serial interface 42, a computer 44, and sensor/current control circuitry 46. Digital communication for field instrument 14 is provided through serial interface 42. Incoming digital signals are received by serial interface 42, are demodulated and provided to computer 44. Similarly, response messages are transmitted by serial interface 42 under the control of computer 44.

Sensing of the parameter and the control of loop current $I_T$ as a function of that parameter is provided by sensor/current control circuitry 46. Computer 44 stores data used by sensor/current control circuit 46, such as span and zero calibration data. Computer 44 also stores data which identifies field instrument 14 so that control system 12 and communicator 16 can, by addressing field instrument 14, determine the type of transmitter, revision levels of the transmitter and its communication interface capabilities, a serial number identifying the transmitter, and the number of preambles required to activate the serial interface 42 of the field instrument 14 before actual data is sent to transmitter 14.

The embodiment shown in FIGS. 1 and 2 shows an industrial process control system 10 in which a single field instrument 14 is connected by a two-wire current loop communication link 18 with a control system 12 and a communicator 16. FIG. 3 shows another embodiment of the present invention, in which a control system 52 is coupled by a two-wire communication link 54 to a plurality of field instruments 56A–56N. Communicator 58 couples to communication link 54 in order to communicate with the field instruments 56A–56N.

In process control system 50, all communication between field instruments 56A–56N and control system 52 is provided digitally over communication link 54. This includes not only communications of the type described with reference to FIGS. and 2, but also the sending of parameter values. In a preferred embodiment, each of the field instruments 56A–56N is powered by current carried by communication link 54, and uses communication link 54 for the sending and receiving of digital information.

Field instruments 56A–56N are slave units which communicate over communication link 54 only when specifically addressed by a master unit such as control system 52 or communicator 58. In system 50, either control system 52 or communicator 58, or both, can be communicating as a master unit over communication link 54. The present invention provides for synchronization of control system 52 and communicator 58 when both are connected to communication link 54, so that both have substantially equal priorities as master units which allows them to alternate transmissions over link 54. In addition, the present invention prevents lock-up of access to communication link 54 by assigning different priorities to control system 52 and communicator 58 in the case of a simultaneous unarbitrated access request.

The following discussion of message formats of the present invention and of the communication arbitration protocol is equally applicable to the embodiments of FIGS. 1 and 3.

All digital data which is transferred over the communication link 18 or 54 is transferred in the form of frames. A frame is an encapsulation of user data in control and addressing information. A frame is delineated by the combination of preamble bytes and a unique "start of frame" character which identifies its beginning and by a length field which determines where the frame ends. The source and destination of data within a frame is determined by an address field in the frame. The master unit generating the frame is identified by the high order bits in the address field and the nickname or short address of the slave unit (field instrument) is identified by the lower order bits in the address field. The interface between the communication protocol and the remainder of the master unit or slave unit hardware and software is through a command field which identifies whether a command is a communication protocol command or a user command, and by a response code field which conveys the result of a communication protocol transaction back to the user. User data, if any, is transferred in the data field. All portions of the frame are protected by a combination of hardware or software generated parity and a trailing parity check field. All fields in a frame are an integral number of bytes in length.

As discussed previously, unique identifiers are stored by the computer in each field instrument 14, 56A–56N which is manufactured. In one embodiment of the present invention, the unique identifiers are six bytes in length and consist of various types of identifying information, revision level information, and a unique serial number. The communication protocol, however, does not use these unique identifiers to address devices on communication link 18, 54. Instead, a short form address is dynamically associated with each field instrument 14 or 56A–56N connected to communication link 18 or 54.

FIG. 4A shows a format of a master unit-to-slave unit message. The frame shown in FIG. 4A is included in the transmit time of a transmit-receive cycle of a master on the bus. This is a message which could be sent by either master unit (control system 12 or communicator 16 in system 10 of FIGS. 1 and 2, or control system 52 or communicator 58 of system 50 of FIG. 3). The order in which the frame is transmitted is shown by reading from left-to-right in FIG. 4A.

The first field in a FIG. 4A is selected to be the ASCII "start of text" (STX) character. The STX character is typically preceded by a minimum of two preamble bytes of hexadecimal FF, which activates the serial interface of the device being addressed before the frame is received.

The second field in the frame is an address (ADDR). This is one byte long, with the low order bits specifying one of the possible nicknames, i.e., dynamic or short form addresses, for the field instrument being addressed. The high order bits indicate which master unit generated the message. Slave units always echo back the address field unchanged as described later in connection with FIG. 4B.

The third field in FIG. 4A is the command (CMD) byte. One group of command byte values (for example in the range 0–31 inclusive) are reserved for use by the communication protocol and are not used as commands interacting with the slave unit's sensor/current control 46. Command byte values in a second range (such as values 32-255 inclusive) are available for interaction with the sensor/current control 46. Alternatively, commands can be of three different types: universal commands to which all applicable field instruments respond; common commands to which field instruments in a selected class respond; and special commands to which only a particular type of field instrument responds. Command bytes are echoed back by the slave unit (field instrument) unchanged as described below in connection with FIG. 4B.

The fourth field shown in FIG. 4A is the byte count field. It is one byte in length and specifies the number of bytes of information that follow between this byte and the parity check byte that terminates the frame. In other words, the byte count field is a count of the number of bytes of user data that follow.

The fifth field consists of an integral number of bytes of user data. The actual number of data bytes is user-determined within the bounds defined by the byte count field.

The sixth field is a one-byte parity check byte. This value is determined by an exclusive "or" of all bytes of a transmitted frame. It is used along with hardware or software generated parity checks on individual bytes for error detection. This field in FIG. 4A is generated as the master unit transmits a frame, and is checked by the slave unit (field instrument) when a frame is received.

FIG. 4B shows the format of a slave unit to master unit frame. The frame of FIG. 4B is transmitted during the transmitter time-out period of a transmit-receive cycle. The first field of the slave/master frame is the leading delimiter, the ASCII character ACK. The master units sense the ACK character identifying the message frame as one generated by a slave unit. The ACK character is typically preceded by a minimum of two preamble bytes, hexadecimal FF, which are sensed by the serial interface of the device being addressed to activate it before the frame is received.

The second field is the address (ADDR) field. This field is identical to and echoed from the incoming master-to-slave frame within the same transmit-receive cycle.

The third field is the command byte CMD. This is echoed from the incoming master-to-slave frame within the same transmit-receive cycle. The fourth field is the byte count field. This specifies the number of bytes falling between it and the parity check byte at the end of the message. The minimum value of this field is one, since all slave-to-master frames at least have a response code byte (status).

The fifth field (status) is unique to slave-to-master frames. The status field holds a one-byte response code that transmits the result of the attempted transaction back to the originating master unit. The status field is bit masked. Bit 7 is set if the slave-to-master frame is a negative acknowledgement. This indicates the occurrence of some communication error, and the remaining bits are used to specify the nature of the error in greater detail. Bit 7 is cleared if it is a positive acknowledgement. In this case, the low order seven bits carry status information regarding the success or failure of the command contained in the master-to-slave frame. For protocol commands, the low order seven bits are used by the communication protocol to determine the success or failure of a communication protocol command. If the command is not a communication protocol command, no interpretation is carried out by the protocol and the status bits are passed on to the other portions of the slave unit.

The seventh field in FIG. 4B is the parity check field. It is calculated and checked in a manner identical to that for master-to-slave frames.

In system 10 of FIGS. 1 and 2 and system 50 of FIG. 3, a pair of master units share a common communication link with one or more slave units. The present invention involves a communication protocol by which the two master units share access to the common communication link, and thus to communications with the slave unit or units. The arbitration of access to the communication link is controlled by timeouts that represent lengths of time that devices (master units and slave units) executing the communication protocol use to determine what they do next based on whether or not they receive transmissions on the communication link. Timeouts are measured as the interval between transitions of the protocol state machine which is the portion of each device (typically the computer) which actually executes the communication protocol. Transitions are initiated when a transmission is completed or when a response is received (i.e. when preambles and frame synchronization are detected).

The most fundamental protocol timeout is the field instrument timeout (TTO). This is the maximum amount of time that it could possibly take a field instrument to respond to an incoming message. All other timeouts within a given system are based upon the value of the field instrument timeout TTO. It critically controls performance of the system, and should be made as small as possible. It is identical for all field instruments.

For each master unit, there are two arbitration timeouts—the link grant timer RT2, the link quiet time or transmitter time-out RT1.

RT2, the link grant time, is the smallest of the time periods comprising the transmit-receive cycle. It has the same magnitude in both master units. It is set to a sufficiently large value to allow the other master unit adequate time to initiate transmission (if it has been directed by a user to do so) after the master unit which is executing the RT2 timeout has just completed a transaction. The link grant time RT2 delays a subsequent transmission long enough for the master unit to detect a carrier due to the other master unit's communication.

The link quiet time or transmit time-out RT1 is the next larger interval. This time period must be long enough to ensure that any response from a slave unit would be received at a master unit and hence must be greater than TTO by at least the turn-off and turn-on delays associated with carrier and message detection in the serial interface of the master units. When used for "link quiet" time detection, RT1 ensures that no ongoing transaction will be interrupted by a master unit which is seeking access to the communication link. RT1 has a different magnitude for the two master units to allow a resolution of a collision if the master units are out of synchronization and attempt to transmit simultaneously.

Figure 6:
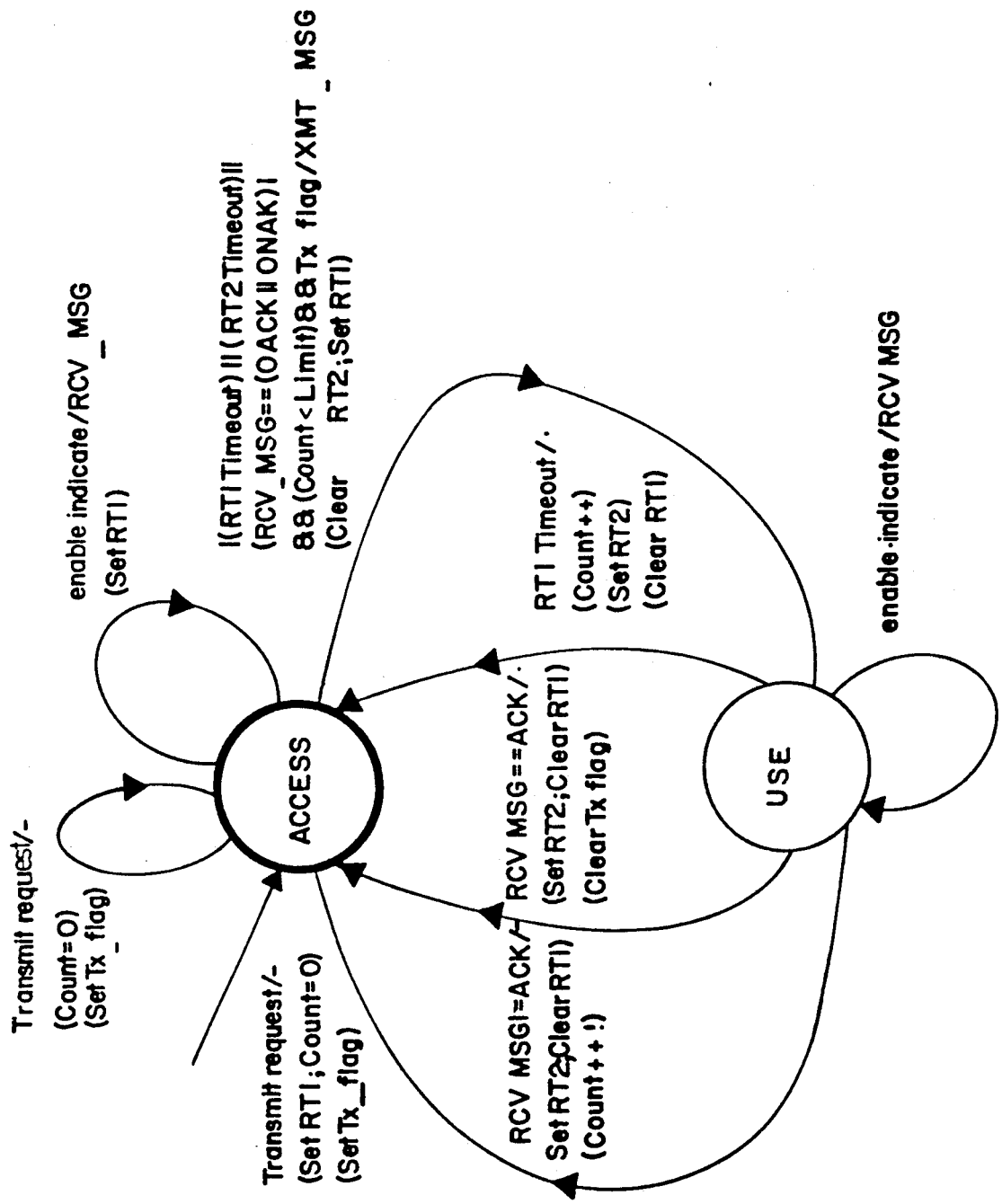
FIG. 6 is a finite state diagram of the communication arbitration protocol of a master unit of the system of FIG. 2.

In FIGS. 5 and 6, the operation of a slave unit (field instrument) and a master unit (control system or communicator), respectively, in performing the communication protocol of the present invention is described by finite state transition diagrams. In these diagrams, the labeled circles represent states that the machine can be in. Transitions between these states are shown by directed arcs. They show which state a protocol leaves and which state it enters. A transition is labeled with the condition that caused it and the corresponding output (which may be a null). A transition label is written by a "transition cause" followed by a slash or "/" followed by the corresponding "output". Actions to be executed as a consequence of a transition are shown adjacent the transition arc and are shown in brackets. Finally, the heavier outlined circle represents the terminal state of the finite state machine. In other words, the end of processing of transitions of the machine must end in this terminal state.

FIG. 5 describes the operation of the slave unit (field instrument). Any incoming message triggers the arbitration protocol state machine within the transmitter as indicated by the line labelled "RCV_MSG". For example, in the system of FIG. 2, the RCV_MSG signal is provided by serial interface 42 to computer 44. At that point, the field instrument's communication "wakes up" or is activated in the INIT state and begins operation by waiting to sense a correctly framed message from a master unit (i.e. with STX as the first byte, etc.). Incorrectly framed messages are ignored.

Next, the address field is checked against the field instrument address. If the field instrument's dynamic address does not match the address in the address field, the message is ignored. This is shown by the transition arc which begins and ends with INIT and which is labeled Address_match/-.

If the addresses match, the machine makes a transition to the receive state as shown by the line labelled "Address_match/- in FIG. 5. Once it has received the complete message, a parity check is performed. If there is a parity error or if the message buffer overflows, a negative acknowledgement (ACK with a bit set in the response byte indicating negative acknowledgement, "NAK") is returned, and the protocol returns to the INIT state as indicated by the arc labelled Parity or Buffer/NAK in FIG. 5.

If the message is received without errors, the protocol passes the information in the message on to the remaining hardware and software within the slave unit (field instrument) as indicated by an arc labelled "Buffer & Parity/Transmit indicate" in FIG. 5. In other words, the communication system has, at that point, done its job. It is handing over command of the data field portion of the message to the remainder of the slave unit (field instrument) to process the data. This is done through a "transmit indicate" output. In addition, the field instrument timeout TTO timer is set or started. This defines the time period within which the slave unit must complete processing of the data and send a response back to the master unit.

When the remaining hardware and software within the slave unit executes a transmit response, an acknowledgement message (ACK) is formulated and returned and a transition occurs from the process state to the INIT state as shown by the arc labelled "Transmit response/ACK" in FIG. 5. In addition, timer TTO is cleared upon execution of a transmit point response.

If the hardware and software within the field instrument does not complete processing and produce a transmit point response before TTO expires, a negative acknowledgement (NAK) is returned and any subsequent "transmit response" is ignored by the communication protocol. The protocol returns to the INIT state and waits for the next incoming message as shown in FIG. 5.

FIG. 6 shows the finite state machine diagram for the communication arbitration protocol as performed in each master unit. Differentiation between the two master units is on the basis of the value assigned to a single timeout (RT1) assigned to two of the transitions within the protocol. This results in substantially equal prioritization of the two master units that access the communication link except when there has been a failure of arbitration (due to concurrent attempts by the two master units to access the communication link). The master unit finite state machine fulfills two functions. The first is a functionality complementary to that implemented in the slave unit, i.e. that needed to carry out communications reliably. The second component of functionality is required to handle arbitration of access to the slave unit or units between the two master units. This partitioning of functionality is reflected in the finite state diagram shown in FIG. 6. Transitions associated with the ACCESS state implement the arbitration, while those with the USE state implement the data transfer.

Link access arbitration is controlled by two defined intervals. The first is the link quiet time or transmitter time-out defined by timer "RT1". This is the maximum interval of time that an unsynchronized master unit, which is trying to access the link, waits after seeing the end of any ongoing transmissions on the link. If no intervening transmissions occur, the link has come free and may be accessed. The second interval, the link grant time is defined by time "RT2" This time RT2 is used to allow the other master unit an opportunity to access the link if desired. If no transmission from the other master unit is received during this interval, the granting master unit is free to initiate another transmission if desired.

When an initial transmission request occurs as shown by the line labelled "Transmit request/- (Set RT1; Count=0)(Set Tx_flag)" in FIG. 6, the finite state machine cycles through the arbitration process. First of all, a check is made for ongoing transmissions on the link. If the link is "quiet", i.e. no transmissions are seen for a period defined by the link quiet time (RT1), then the master unit waits the link quiet time as indicated by the fact that "RT1 timeout" is one of the only three conditions under which a transition can be made to the "USE" state in FIG. 6. This timeout is chosen so as to ensure that any ongoing transaction on the link completes before an attempt is made to access it. The value of "RT1" is established in relationship to the field instrument timeout "TTO", so that "RT1" is greater than "TTO". The arbitration process is also considered complete if during this wait a response from a slave unit addressed to the other master unit is received as shown by the third condition on the transition leading from the "ACCESS" to "USE" state in FIG. 6. In either case, this master unit is now in synchronization, and can immediately transmit its message. Message transmission must start quickly enough so that the other master unit, if any, can sense use of the link by the first master unit, i.e. transmission must start during the link grant time.

Transmitting a message carries the finite state machine to the USE state as shown by the line labelled "Tx flag/XMT_MSG" in FIG. 6. The master unit then waits for a response from the slave as indicated by the line labelled "enable indicate/RCV_MSG". The retry count ("Count") associated with the transmitted message establishes a retry mechanism that allows the master unit to recover from failures on the communication link until a retry limit ("Limit") has been reached. This is controlled by the link quiet or transmit timeout interval associated with time "RT1". This interval is the length of time for which a master unit will wait after sending a message to a slave unit before deciding that the transmitted message has been lost or that the slave unit has failed. This is substantially the same time period as a master unit waiting to use the link needs to wait to ensure that no ongoing transmission is disrupted. Different values are used for RT1 in the two master units to ensure that link synchronization can be recovered if master units make simultaneous attempts to transmit. The master unit will leave the USE state for the ACCESS state updating the retry count for this message if either RT1 times out as indicated by the line labelled RT1 Timeout/- in FIG. 6, or a NAK or illegally addressed or garbled message is received as indicated by the line labelled "RCV_MSG!=ACK/-" in FIG. 6. If a correct response is received, the transmission request has been completed and the master unit will also make a transition to the ACCESS state as indicated by the line labelled "RCV_MSG==ACK/-" in FIG. 6. In every one of these cases, the link grant time (RT2) is enabled (set).

At this stage, the master unit is in synchronization in the ACCESS state. It monitors the link waiting for RT2 to expire. This allows the other master unit (if any) on the link to transmit, if it needs to. If RT2 expires without the master unit detecting any transmissions, then it can retransmit a current message if no response or an incorrect response was received and the retry count has not been exceeded. This is the second condition under which the transition from the "ACCESS" to "USE" state in FIG. 6 can be taken. The master unit may alternatively transmit any new message associated with a transmit request that it receives while in this state or exit if no such request is pending. Note that if the master unit exits (i.e. stops monitoring the link), it is no longer synchronized and will have to go through the longer synchronization time RT1 before transmitting than the shorter RT2 time if it is synchronized.

If, while waiting for RT2 to expire, the master unit detects a transmission on the link, then it must presume that the other master unit is undertaking a transmission. In this case it must now wait for as long as RT1 or until it sees a response addressed to the other master unit on the link as it did when first attempting to access the link.

With the present invention, therefore, very efficient arbitration of use of a common communication link is provided where there are two master units capable of transmitting messages to and receiving messages from one or more slave units. The two master units quickly achieve synchronization without the need for a specific token passing routine or assigned slot times, and without the need for a "collision". As a result, minimum overhead is consumed in achieving synchronization and arbitration of communication link use. The key to this improved arbitration of access is that each master unit must first "listen" before beginning communication on the common link. This gives the master unit an indication of whether the other master unit is active, and if so, where in the communication process the other master unit is so that this master unit can immediately synchronize itself with the other master unit and begin taking turns on the link.

Although the present invention has been described with reference to preferred embodiments, workers skilled in the art will recognize that changes may be made in form and detail without departing from the spirit and scope of the invention.

What is claimed is:

1. For use in a two-master communication system in which first and second master units are capable of communication with one or more slave units, and in which the master units operate so that when both master units are active they alternate in sending messages over a shared communication medium to the one or more slave units; the first master unit comprising:

interface means for connection to the communication medium to transmit messages from the first master unit, for receiving messages from the second master unit and the slave unit and for sensing the presence of messages on the shared communication medium;

input means for providing input signals;

output means for providing an output based on output signals;

means for causing the interface means to send a message on the shared communication medium, setting a link grant timer to a link grant time period and setting a link quiet timer to a link quiet time period;

means for sending messages according to a first protocol by causing the interface means to send an initial message on the shared communication medium if no messages from the second master unit are detected during the link quite time period;

means for sending messages according to a second protocol by causing the interface means to send a subsequent message on the shared communication medium if the link grant time period times out and no messages from the second master unit are detected on the shared communication medium wherein the subsequent message is different from the initial message; and controller means connected to the interface means, the input means, the output means, the means for sending messages according to a first protocol and the means for sending messages according to a second protocol, for controlling operation of the interface means, the means for sending messages according to the first protocol and the means for sending messages according to the second protocol whereby the controller means activates the means for sending messages according to a first protocol if the interface means has detected presence of a message from the second master unit on the communication medium and activates the means for sending messages according to a second protocol if the interface means has not detected message activity from the second master unit, the second protocol providing a shorter time period between successive transmissions by the interface means than the first protocol.

2. The two-master communications system of claim 1 including means for detecting a transmitter time-out of a slave unit if a message is sent to a slave unit and no response is received from the slave unit before expiration of a time-out period.

* * * * *

UNITED STATES PATENT AND TRADEMARK OFFICE
CERTIFICATE OF CORRECTION

PATENT NO. : 5,122,794
DATED : June 16, 1992
INVENTOR(S) : JOGESH WARRIOR

It is certified that error appears in the above-identified patent and that said Letters Patent is hereby corrected as shown below:

Col. 4, line 22, delete "FIG. Control", insert "FIG. 1. Control"

Signed and Sealed this

Seventh Day of September, 1993

Attest:

BRUCE LEHMAN

Attesting Officer   Commissioner of Patents and Trademarks